UNITED STATES PATENT OFFICE.

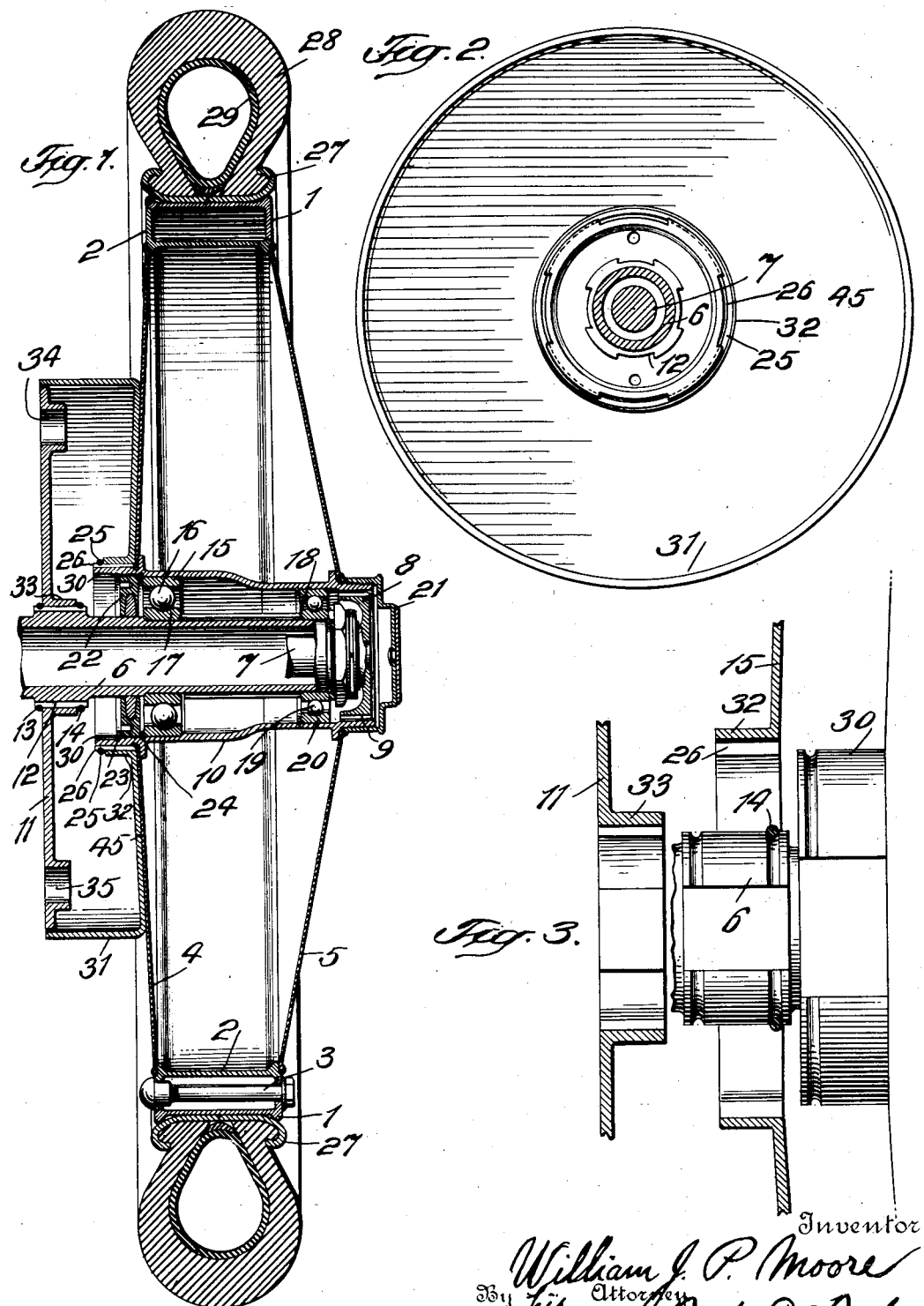

WILLIAM J. P. MOORE, OF NEW YORK, N. Y.

BRAKE-DRUM FOR WHEELS.

1,274,185.  Specification of Letters Patent.  Patented July 30, 1918.

Application filed September 21, 1916. Serial No. 121,360.

*To all whom it may concern:*

Be it known that I, WILLIAM J. P. MOORE, a citizen of the United States, and resident of New York, in the county of New York and State of New York, have invented certain new and useful Improvements in Brake-Drums for Wheels, of which the following is a specification, reference being had therein to the accompanying drawing.

This invention relates to a novel and ingenious brake drum attachment for the wheels of vehicles of various kinds, particularly automobile wheels. The object of the invention is to provide a drum or inclosure which may be readily and easily applied exteriorly to a wheel and axle, commonly an automobile rear wheel, and may with equal facility be disassociated from the wheel, thus making it possible to have the front and rear wheel similarly built, so that either of the wheels by the superaddition of this brake drum feature may be equipped to serve with the braking appliances. By thus making it possible to manufacture all the wheels of similar parts without incorporating the drum into the structure of the rear wheels as is now commonly done, the cost of manufacture will be greatly reduced and economy will be subserved in various ways, besides the symmetry of the wheels will be enhanced for the entire set will present the same appearance, and the ease with which the parts are assembled may be promoted and many other advantages made possible by the simple provision of an external separable brake drum applied as described. The invention, therefore, comprises essentially a drum, casing or compartment for containing a portion of the braking members, which drum may be easily attached to or detached from a wheel and its hub and axle without disturbing in any way the structural combination of the wheel and axle; and also it relates to various details and peculiarities in the construction, arrangement and combination of the various parts, substantially as will be hereinafter described and then more particularly pointed out in the ensuing clauses of claim.

In the accompanying drawing illustrating my invention :—

Figure 1 is a cross-section of my improved brake drum represented as practically applied to a wheel for operative use in connection therewith.

Fig. 2 is a left hand side elevation of the drum in detail, with the cover removed and apart from the wheel, but with the axle and drive shaft shown in cross-section at the center.

Fig. 3 is an enlarged sectional side view of various details of the drum and hub on which it is mounted, shown disassembled from each other so as to indicate more clearly their form and relative size and shape.

Similar characters of reference designate corresponding parts throughout the different figures of the drawing.

In order to describe the practical way of arranging my improved brake drum with a wheel, I have herein delineated a certain type of rear wheel of automobile or other vehicle, together with its hub, axle, and driving shaft, in connection with which I have arranged said drum, but it must be understood that the same is given here merely by way of illustration and with no idea of confining my invention thereto; and also it must be clearly accepted that the wheel structure which I am describing may be either a rear wheel or a front wheel of an automobile or other vehicle, and in so far as the attachment of the brake drum is concerned, the front and rear wheels may be practically the same and the drum may be applied to either.

This example of wheel consists of the outer circular felly, which in the present example has a box-like or hollow form and consists of the two circular members 1 and 2 cut on a diagonal plane and held together by a series of bolts 3. Encircling this felly is a rim 27 of any ordinary clencher or demountable type, the details of which are not shown, and the same carrying the usual outer casing 28 and inner inflatable tube 29. At the center of the wheel is the hub 10. A pair of annular disks 4 and 5 are welded or otherwise firmly united to the hub 10 and to the inner member 2 of the hollow felly. The outer end of the hub 10 is screw-threaded to receive a hub cap 21 which screws thereon in the usual way. 6 denotes the rear axle which is stationary and which houses therein a horizontal drive shaft 7 carrying at its outer end a disk 8 which is keyed or splined at 9 to the inner wall of the hub 10 so that the revolution of the drive shaft 7 may communicate rotary motion to the hub 10. Furthermore within the hub 10 are two or more ball bearings, the outer one of which consists of a raceway 18 surrounding the axle 6 and carrying between it and another raceway 20, which is fast inside of the hub 10, one or more series of balls 19 as shown in Fig. 1; while there is another ball bearing at the other end of the hub 10 consisting of an inner raceway 17 tightly placed on the axle 6 carrying between it and the outer raceway 15 one or more series of balls 16, said outer raceway 15 being held within the hub 10; furthermore a ring 22 is screwed into the inner end of the hub 10, in order to close said end and hold the parts in place, and this ring preferably is associated with a split wire ring 23 on one side and another similar split wire ring 24 on the other side which are both let into recesses on the inside of the hub 10 as indicated in Fig. 1. The inner end of the hub 10 is extended somewhat beyond the ring 22 and provides a sleeve 30 of greater or less length, which offers a bearing for the support of the brake drum. As will be clearly perceived, the details which I have just been describing may, many of them, vary within wide limits, but it is convenient to make most of them in all the four wheels of a set of wheels practically the same, since the brake drum is ordinarily placed within or between the members which connect the central or hub member of the wheel with the circular or rim members, instead of being supported on the outside thereof as is the case with my improved construction which I am now describing.

The drum proper consists of an annular disk 45 having at its outer edge an integral band 31 concentric with the drive shaft 7. Contiguous to the wheel is this disk-like wall 45 which may be vertical or may be slightly inclined or cone-shaped to correspond to the shape of the disk 4 against which it may tightly rest. At the center of the wall 45 is a sleeve-like flange 32 which is concentric with the outer sleeve 31 and which surrounds the sleeve-like extension 30 of the hub 10. The two sleeves 30 and 32 therefore telescope with each other and they are splined or keyed together with a suitable number of ribs, as indicated at 26, as for example, a sextuple spline arrangement, so that they may rotate together. It will be noted that they are easily assembled by simply slipping the sleeve 32 over the sleeve 30, causing the keys and keyways to properly engage with each other and when the drum is pressed tightly home against the contiguous wall of the wheel disk 4, it may be held there by the use of a split wire ring 25 which is let into a circular groove in the sleeve close against the end of the sleeve 32.

Opposite to the vertical wall 45 of the brake drum is a cover 11, having a diameter closely approaching the diameter of the rim 31 of the brake drum and loosely placed therein so that the drum can rotate while disk 11 is stationary. Said disk is mounted upon the stationary axle 6 by being splined or keyed thereto, and for convenience in effecting this, I provide said disk 11 at its center with a hub or sleeve 33 which surrounds the keys or ribs and grooves at 12 on the axle 6 and are held in place by means of split wire rings 13 and 14 let into circular grooves in the axle 6 on opposite sides of the disk 11 close up against the hub 33 of said disk so that the disk may be kept stationary and laterally immovable upon the axle. This keyway or splining device at 12 may be a sextuple spline like that which I employ in connection with sleeve 30 at the end of the hub 10 or it may be any other form of keying or locking means by which the disk 11 can be effectively mounted on the axle and caused to remain stationary therewith. It is readily removable. The insertion of the braking appliances which are to be inclosed within the drum and the inspection and repair of such appliances at any time is accomplished in the usual manner. Said disk 11 may be provided with openings 34 and 35, two or more, or any other number, having bosses around them if preferred, and used for the admission of brake rods and for supporting the fulcrum pin of the braking parts.

Thus it will be seen that I provide a separable, external, simple, compartmental structure which is easily attached to the sides of the disk wheel or any other wheel, and is mounted thereon without bolts or flanges, with its cover adjacent thereto stationary on the axle, so that the same function is performed as is ordinarily attained by brake drums of a more complicated structure that are built into the wheel and carried thereby in an inseparable and permanent manner; while a wheel to which my improved separable drum is attached is enabled to perform its function as a rear wheel with a braking function, or as a front wheel by removing the drum. It will be evident that by simply removing the disk by disengaging the splines and also removing the drum proper by disengaging its splines from the hub, the wheel can be instantly simplified and converted into the form of wheel which is considered more suitable for the idle wheels at the front end of an automobile, although as I have said I do not wish to be confined to any particular place for locating the drum, but its separable character makes it extremely useful and simplifies the entire device besides economizing in manufacture in many different ways.

Many changes may be made in the precise form and relative arrangement of the various parts without exceeding the scope of the invention, and I therefore reserve the liberty of rearranging and changing the mechanical features within wide limits so long as the essential elements of the invention are preserved intact.

Having thus described my invention, what I claim as new and desire to secure by Letters Patent, is:—

1. In a brake device for wheels and the like, the combination of an axle having a boss thereon affording a bearing, a disk having a central flange keyed to said boss, a hub revolving on the axle and having a sleeve-like extension, a brake device consisting of a disk with a central flange keyed to said extension, and also with an outer concentric flange loosely surrounding the disk which is keyed to the aforesaid boss, an outer wheel member, and connections between it and the hub, against which connections on one side of the wheel the brake device securely fits.

2. In a brake device for wheels and the like, the combination of an annular disk having a central flange and an outer concentric flange, a disk fitting loosely as a cover within the outer flange and having a central flange, a hub having a sleeve-like extension on which the brake drum is mounted, a plurality of splining devices for holding said brake in position, all arranged so that the cover can remain relatively stationary with the axle while the brake device revolves.

In testimony whereof I hereunto affix my signature.

WILLIAM J. P. MOORE.